9449X
S. Coleman.
Axle.
No. Patented Mar. 2. 1836.
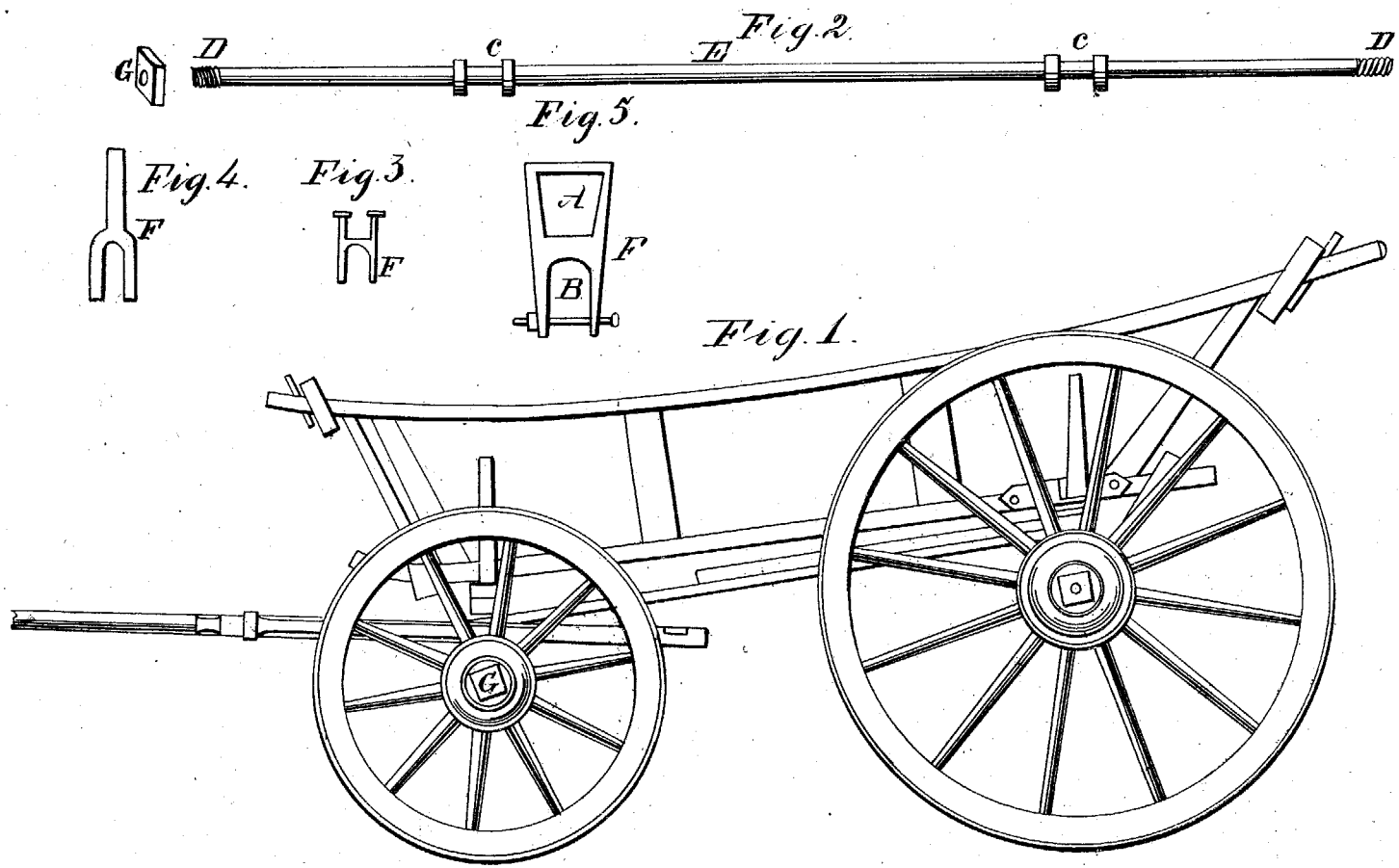

X 9449X av.15

Mar. 2. 1836 32

Spencer Coleman, of Spotsylvania Co. Va.

Letters Patent

The schedule referred to in these Letters Patent and making part of the same, containing a description in the words of the said Spencer Coleman himself of his improvement in the unconfined rolling axle for waggons, carriages &c.

---

To all to whom these presents shall come: Be it known that I Spencer Coleman of the County of Spotsylvania and State of Virginia have invented a new and useful improvement in the construction and adaptation of the unconfined rolling axle to waggons, carriages &c. and that the following is a full and exact description of the construction and operation of the said improvement as invented by me. The rolling axle made applicable to all roads is thus constructed. The axle is made round of a sizes suitable to the boxes of the wheels to which it is to be attached. The spindles should be tapered equally on all sides - to conform to the variation in the boxes two vertical projections, one inch high or more are made near each end of the axle. the two outer ones forming shoulders for the hub and the space between them and the other projections, of two or three inches, serves for the reception of the boxes which are attached to the bolsters. This axle is formed thus see Fig. 2. The bolsters may be made in the ordinary manner: they are banded at the ends a continuation of these bands from the upper boxes. This is an edge view of the band and box. Fig. 5. the part occupied by the letter A. is firmly fastened to the end of the bolster, and that by the letter B embracing (without tension) that part of the axle between the vertical projections, which should be the largest part of the axle as it receives nearly all the friction, when the shafts are to be attached to the axle without the intervention of a bolster, the upper box is found thus (see fig. 3) The rods reaching from the upper part of the box are fastened to the shafts by screws and tap. It is important that there should be no binding on the axle or tightness either in the boxes of the wheels, or of those in the bolster - giggs are adapted to the rolling axle by receiving the shaft of the upper boxes in the place of the prop which reaches from the axle to the shaft of the 38. 9449X gigg boxes for carriages of light burden are formed thus (See fig 11) They are the most simple in construction and sufficiently strong for gigs. Sulkies &c. which generally will require no other alteration than the axle near the shoulder being made round and smooth where they receive the upper boxes. The upper boxes are confined on the axle (in every case) by a rod passing through them on the under side of the axle with a head on one end, and a screw and a tap on the other.

Witnesses
Robt. G. Coleman
Elliot Dejarnatte

Spencer Coleman

[illegible]

[illegible] 585 [illegible]